(12) United States Patent
Yin

(10) Patent No.: US 8,537,473 B2
(45) Date of Patent: Sep. 17, 2013

(54) LENS MODULE WITH LOW CHROMATIC ABERRATION

(75) Inventor: Wei Yin, Guangdong (CN)

(73) Assignees: Premier Image Technology(China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 78 days.

(21) Appl. No.: 13/329,158

(22) Filed: Dec. 16, 2011

(65) Prior Publication Data

US 2013/0044378 A1    Feb. 21, 2013

(30) Foreign Application Priority Data

Aug. 19, 2011    (CN) .......................... 2011 1 0239788

(51) Int. Cl.
*G02B 3/02*    (2006.01)
(52) U.S. Cl.
USPC ............................. 359/715; 359/642; 359/754

(58) Field of Classification Search
USPC .................................. 359/642, 708, 715, 754
See application file for complete search history.

(56) References Cited

U.S. PATENT DOCUMENTS

| | | | |
|---|---|---|---|
| 7,277,238 B2 * | 10/2007 | Noda ............................ 359/715 |
| 7,321,474 B1 * | 1/2008 | Jo ................................. 359/773 |
| 7,355,801 B2 * | 4/2008 | Chen et al. .................... 359/773 |
| 7,408,723 B1 * | 8/2008 | Lin ............................... 359/715 |
| 7,609,454 B1 * | 10/2009 | Yin et al. ...................... 359/648 |

* cited by examiner

*Primary Examiner* — James Greece
(74) *Attorney, Agent, or Firm* — Altis Law Group, Inc.

(57) ABSTRACT

Provided is a lens module for imaging an object on an image plane. In the order from the object side to the image side of the lens module, the lens module includes a first lens made of glass and having positive refraction power, a second lens made of plastic and having negative refraction power, a aperture stopper, a third lens having positive refraction power, and a fourth lens having negative refraction power. The lens module satisfies the following formula: Vd1−Vd2≧35; wherein, Vd1 is the Abbe number of the first lens in d light and Vd2 is the Abbe number of the second lens in the d light.

6 Claims, 9 Drawing Sheets

LENS MODULE WITH LOW CHROMATIC ABERRATION

BACKGROUND

1. Technical Field

The present disclosure relates to lens modules and, particularly, to a lens module with low chromatic aberration.

2. Description of Related Art

In order to improve image quality, lens modules usually include a number of lenses. One typical lens module includes a first lens and a second lens both made of plastics in an order from an object side to an image side. This type of lens module usually has poor chromatic aberration correction properties because plastic has a narrow range of chromatic dispersion. Another typical lens module includes a first lens and a second lens both made of glass by grinding, which is costly, in an order from an object side to an image side. This type of lens module usually has high chromatic aberration correction properties but increases the cost of the lens module module.

Therefore, it is desirable to provide a lens module which can overcome the limitations described above.

DETAILED DESCRIPTION

Embodiments of the disclosure will now be described in detail with reference to the accompanying drawings.

Figure 1:
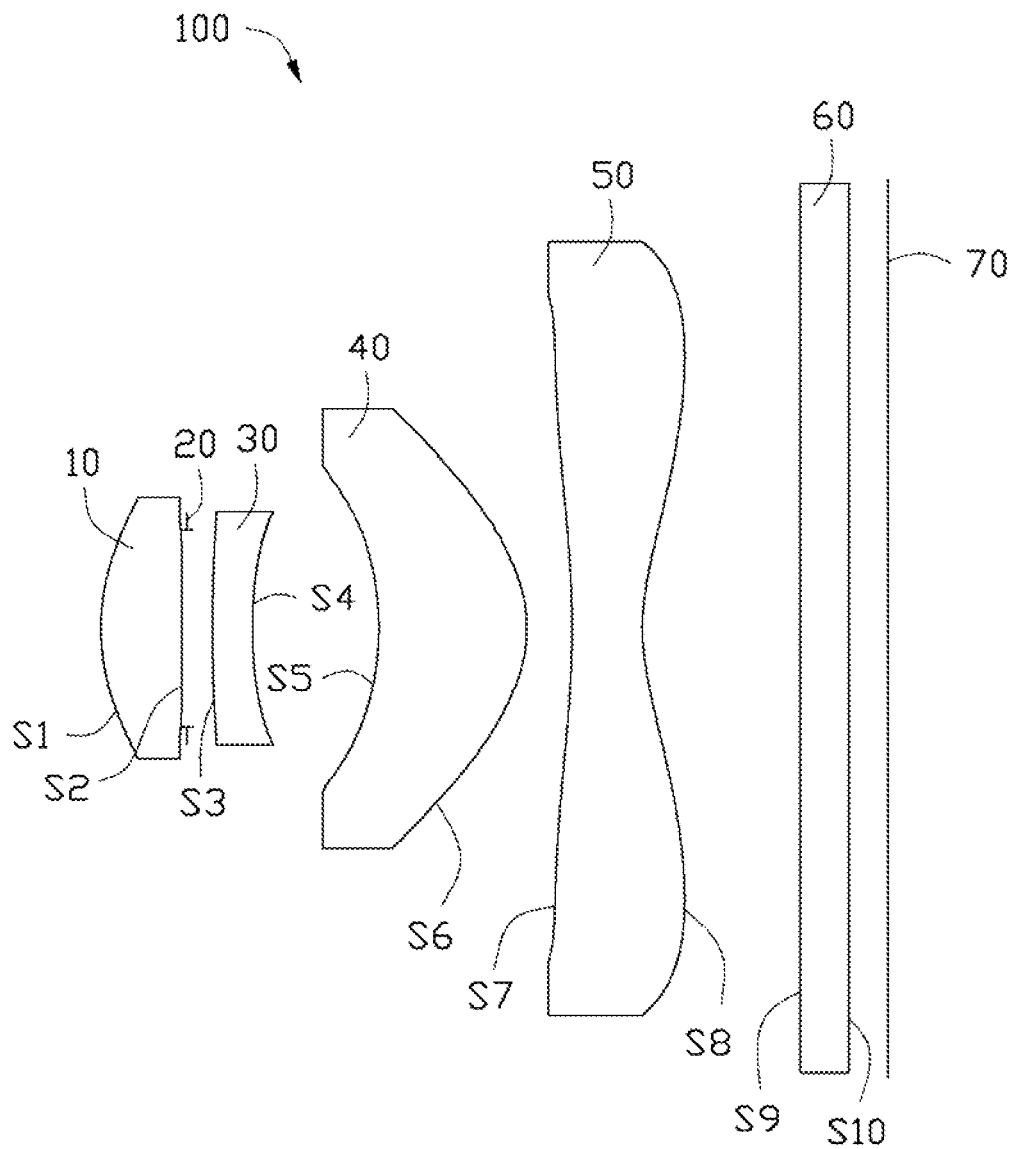
FIG. 1 is a schematic view of a lens module in accordance with the present disclosure.

Referring to FIG. 1, a lens module 100, according to an exemplary embodiment, optically captures an image of an object at an object side and forms a corresponding image at an image side, particularly, at an image plane 70. The lens module 100 includes, in an order from the object side to the image side, a first lens 10 with positive refraction power, an aperture stop 20, a second lens 30 with negative refraction power, a third lens 40 with positive refraction power, a fourth lens 50 with negative refraction power, and a filter glass 60.

The first lens 10 is made of glass by mould pressing technique. The first lens 10 is low chromatic dispersion and includes a convex first surface 51 facing the object side and a concave second surface S2 facing the image side. The second lens 30 is made of plastic by injection molding and includes a convex third surface S3 facing the object side and a concave fourth surface S4 facing the image side. The third lens 40 is made of plastic by injection molding and includes a concave fifth surface S5 facing the object side and a convex sixth surface S6 facing the image side. The fourth lens 50 is made of plastic by injection molding and includes a concave seventh surface S7 facing the object side and a concave eighth surface S8 facing the image side. The filter glass 60 includes a planar ninth surface S9 facing the object side and a planar tenth surface 10 facing the image side. The filter glass 60 filters/removes infrared light from the light rays. Light rays enter the lens module 100, passing through first lens 10, the aperture stop 20, the second lens 30, the third lens 40, the fourth lens 50 and the filter glass 60, finally forming optical images on the image plane 70.

An image sensor, such as charge coupled device (CCD) or complementary metal-oxide-semiconductor transistor (CMOS), can be positioned on the image plane 70 thus, converting the optically images into electrical signals.

The lens module 100 satisfies the formula:

$$Vd1-Vd2 \geq 35; \quad (1)$$

Wherein Vd1 is an Abbe number of the first lens 10 in d light (wavelength: 587.6 nm) and Vd2 is an Abbe number of the second lens 30 of d light. Formula (1) is for correcting chromatic aberration of the lens module 100. If the lens module 100 does not satisfy the formula (1), the images captured by the lens module 100 will have a greater chromatic aberration.

The lens module 100 further satisfies the formula:

$$F/TTL \geq 0.5; \quad (2)$$

Wherein F is the focal length of the lens module 100. TTL is the total length of the lens module 100, that is, TTL is the distance between the first surface S1 and the image plane 70 along an optical axis of the lens module 100. Formula (2) is for maintaining quality of images captured by the lens module 100. If the lens module 100 does not satisfy the formula (2), the images captured by the lens module 100 cannot be corrected.

The lens module 100 further satisfies the formula:

$$0.5 \leq F1/F \leq 1; \quad (3)$$

Wherein, F1 is the focal length of the first lens 10. Formula (3) is for improving image quality and minimizing the size of the lens module 100.

Each of the first, second, third, fourth, fifth, sixth, seventh and eighth surfaces S1, S2, S3, S4, S5, S6, S7 and S8 is an aspherical surface. Each aspherical surface is shaped according to the formula:

$$x = \frac{ch^2}{1 + \sqrt{1 - (k+1)c^2h^2}} + \sum A_i h^i,$$

wherein h is a height from the optical axis of the lens module 100 to a point of the aspherical surface, c is a vertex curvature, k is a conic constant, and Ai are i-th order correction coefficients of the aspherical surface.

Detailed examples of the imaging lens 100 are given below in accompany with FIGS. 2-9, but it should be noted that the imaging lens module 100 is not limited by these examples. Listed below are the symbols used in these detailed examples:

F: focal length of the lens module 100;
F1: focal length of the first lens 10;
F2: focal length of the second lens 30;
F3: focal length of the third lens 40;
F4: focal length of the fourth lens 50;
F/No: F number;
2ω: field angle;
R: radius of curvature;
D: distance between surfaces on the optical axis of the lens module 100;
Nd: refractive index of lens of d light (wavelength: 587.6 nm); and
Vd: Abbe number of d light (wavelength: 587.6 nm).

Example 1

The lens module 100 of a first embodiment satisfies the tables 1-3, wherein F1=2.97 mm, F2=−6.86 mm, F3=2.22 mm, F4=−2.05 mm, TTL=4.84 mm; Vd1−Vd2=54.92, F1/F=0.72, and F/TTL=0.85.

TABLE 1

| surface | type | R (mm) | D (mm) | Nd | Vd | K |
|---|---|---|---|---|---|---|
| S1 | aspherical | 1.43391 | 0.512 | 1.497 | 81.56 | −0.872 |
| S2 | aspherical | 43.5293 | 0.024 | — | — | 1.002 |
| aperture stop | flat | Infinity | 0.171 | — | — | — |
| S3 | aspherical | 11.2157 | 0.254 | 1.607 | 26.64 | −744.858 |
| S4 | aspherical | 3.01124 | 0.801 | — | — | 6.304 |
| S5 | aspherical | −1.967 | 0.942 | 1.543 | 56.8 | −0.411 |
| S6 | aspherical | −0.875 | 0.286 | — | — | −3.131 |
| S7 | aspherical | −5.955 | 0.446 | 1.531 | 55.7 | −4.127 |
| S8 | aspherical | 1.37092 | 1.000 | — | — | −10.526 |
| S9 | flat | Infinity | 0.310 | 1.517 | 64.17 | — |
| S10 | flat | Infinity | 0.094 | — | — | — |
| image plane | flat | Infinity | — | — | — | — |

TABLE 2

| | A2 | A4 | A6 | A8 | A10 |
|---|---|---|---|---|---|
| S1 | 1.5257E−02 | 4.45020E−02 | −2.28525E−01 | 3.22734E−01 | −2.89938E−01 |
| S2 | −3.41824E−02 | −1.6418E−01 | 5.33581E−01 | −1.3403E+00 | 1.10061+00 |
| S3 | 6.83487E−02 | −5.6552E−02 | −9.02450E−02 | 2.73556E−01 | −1.98698E−01 |
| S4 | 5.96129E−02 | 9.82812E−02 | −2.39474E−01 | 4.49993E−01 | −2.56024E−01 |
| S5 | −7.88085E−02 | −5.9641E−02 | 2.14626E−01 | −2.6615E−01 | 1.23780E−01 |
| S6 | −1.53571E−01 | 9.74889E−02 | −4.89157E−02 | 1.82063E−02 | −3.06305E−03 |
| S7 | 1.86564E−02 | 9.33651E−04 | −1.54492E−03 | 3.76513E−04 | −3.96035E−05 |
| S8 | −3.54344E−02 | 1.13641E−02 | −2.88105E−03 | 4.29036E−04 | −2.63077E−05 |

TABLE 3

| F(mm) | F/No | 2ω |
|---|---|---|
| 4.13 | 3.0 | 34.4° |

Figure 2:
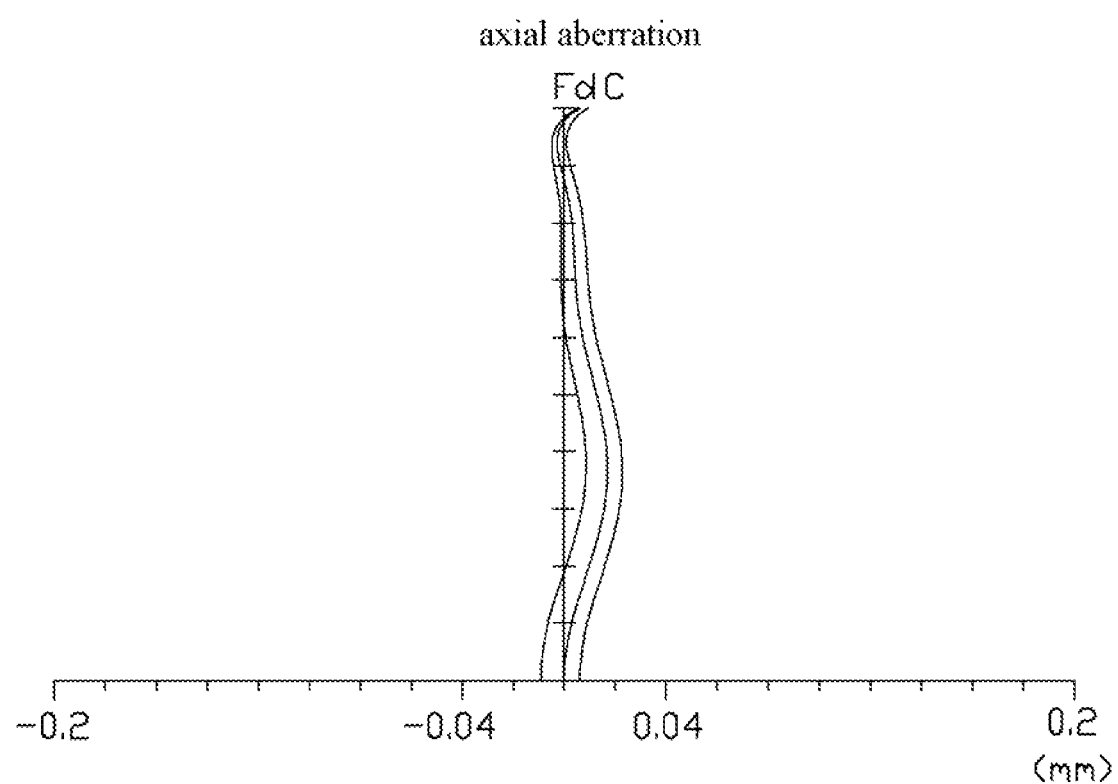
FIG. 2 is a graph showing characteristic curves of axial aberration of the lens module of FIG. 1 in accordance with a first embodiment.
Figure 3:
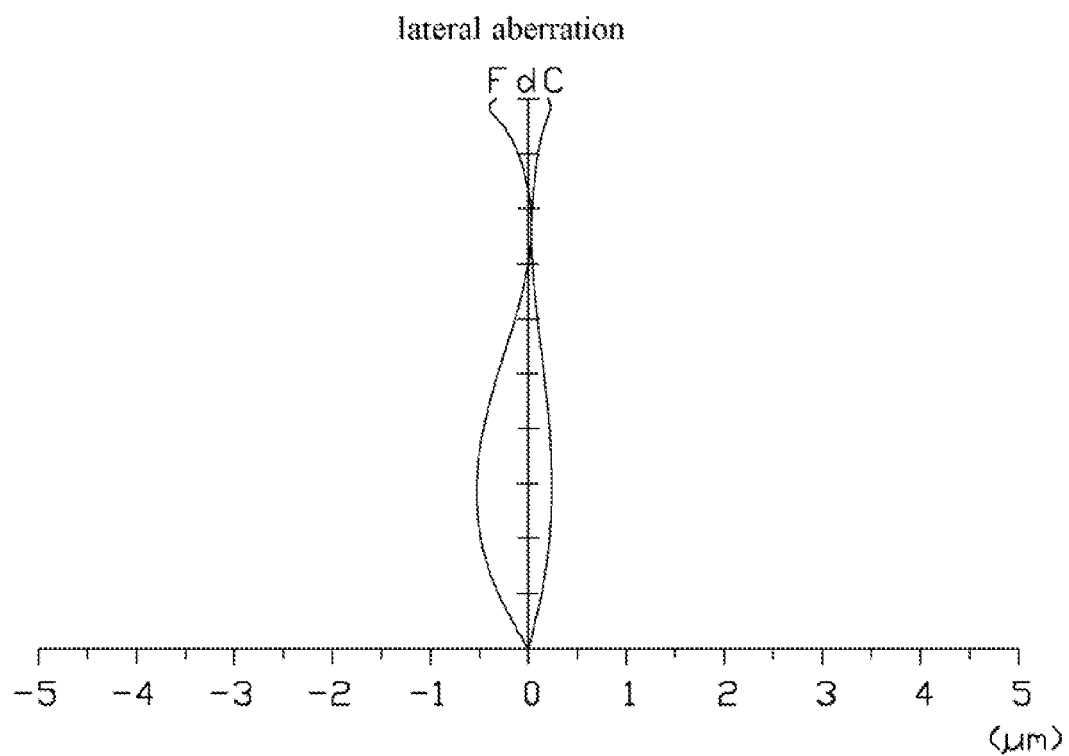
FIG. 3 is a graph showing characteristic curves of lateral aberration of the lens module of FIG. 1 in accordance with the first embodiment.
Figure 4:
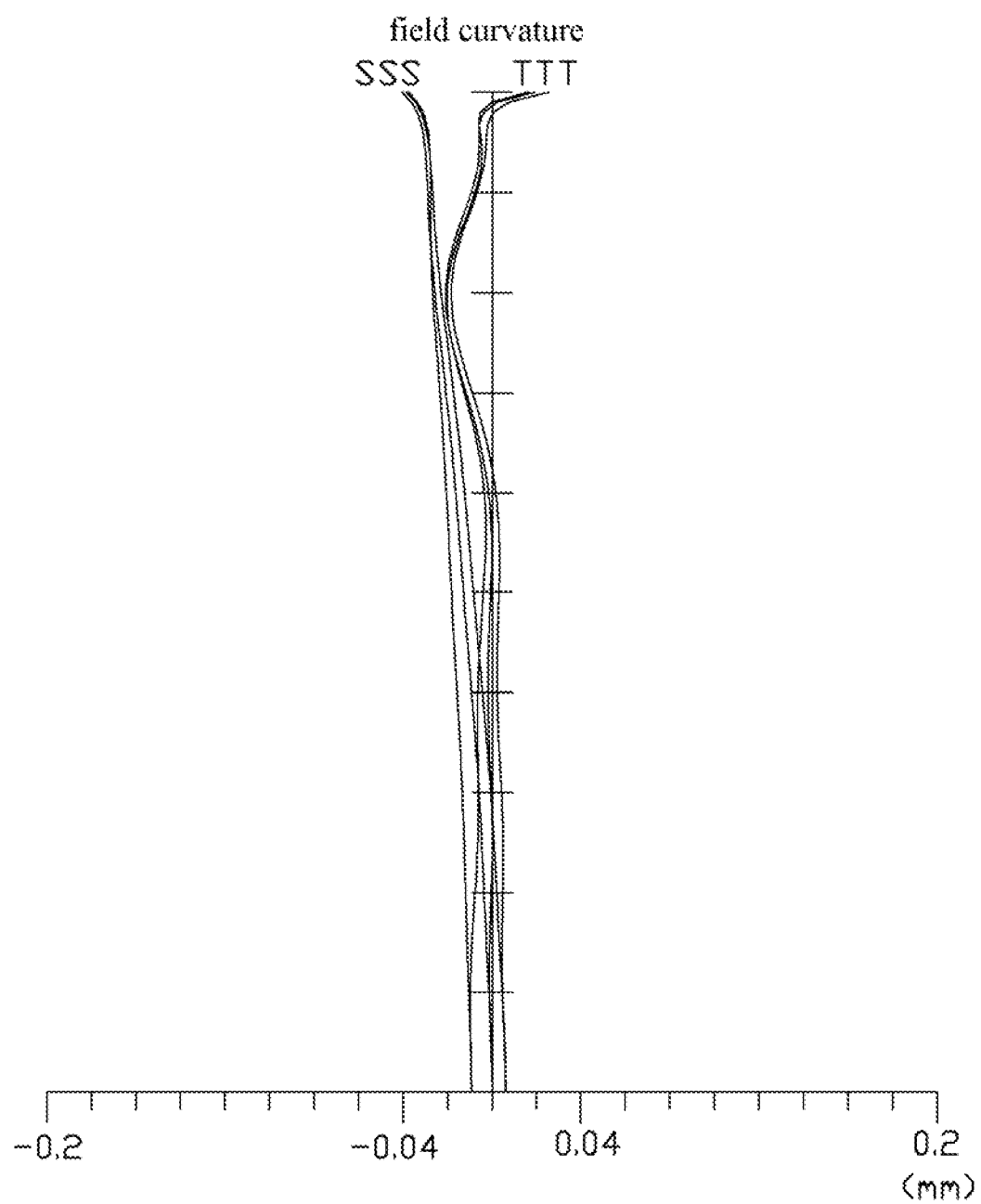
FIG. 4 is a graph showing characteristic curves of field curvature of the lens module of FIG. 1 in accordance with the first embodiment.
Figure 5:
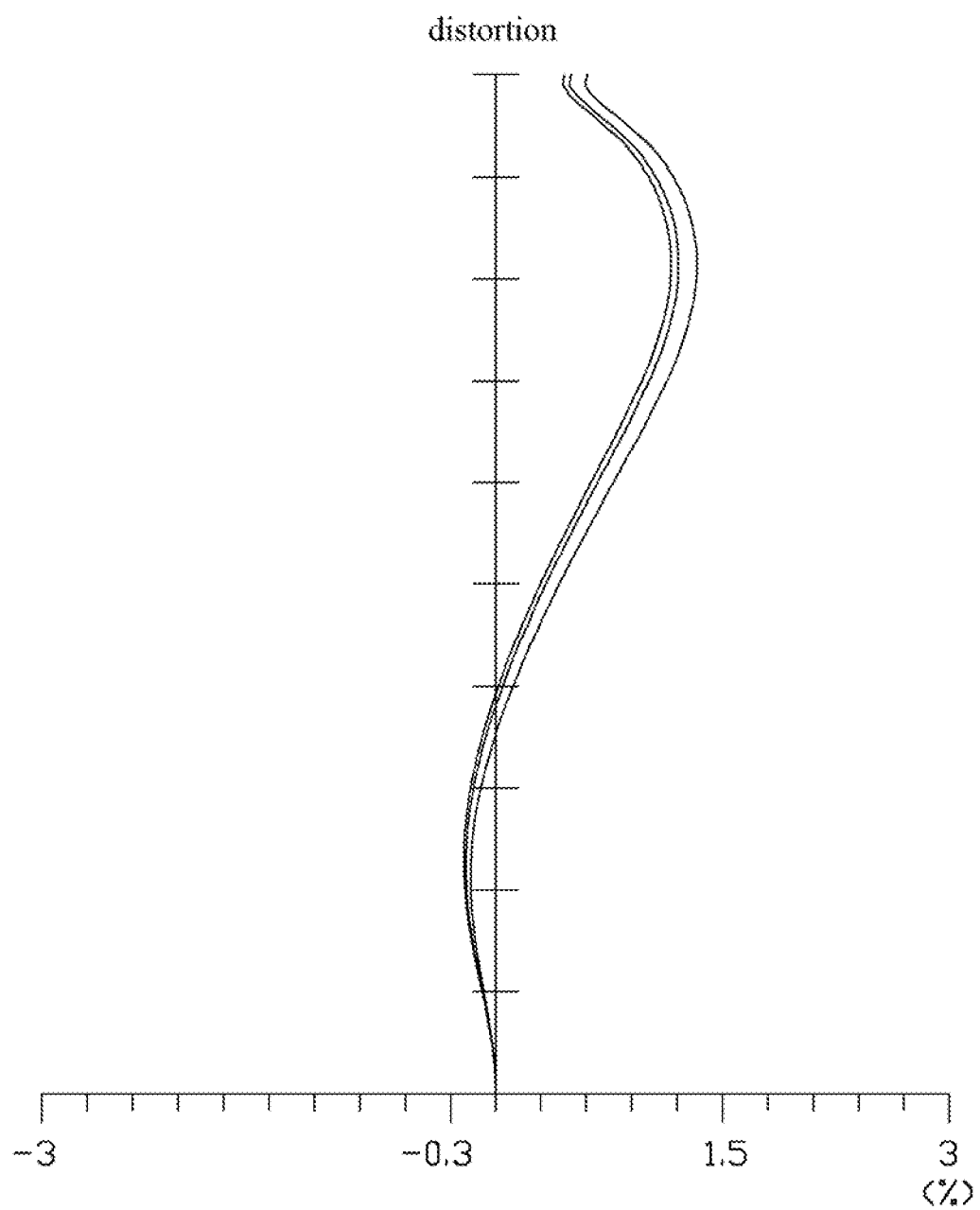
FIG. 5 is a graph showing characteristic curves of distortion of the lens module of FIG. 1 in accordance with the first embodiment.

As shown in FIG. 2, curves F, d, and C are respective axial aberration characteristic curves of F light (wavelength: 486.1 nm), d light (wavelength: 587.6 nm), and C light (wavelength: 656.3 nm) of the lens module 100 of the first embodiment. In this embodiment, axial aberration of visible light (400-700 nm) of the lens module 100 is in a range of: −0.04 mm~0.04 mm. As shown in FIG. 3, curves F, d, and C are respective lateral aberration characteristic curves of F light, d light, and C light of the lens module 100. In this embodiment, lateral aberration of visible light (400-700 nm) of the lens module 100 is in a range of: −0.05 μm~0.05 μm. As shown in FIG. 4, the curves T and S are the tangential field curvature curve and the sagittal field curvature curve, respectively. In this embodiment, field curvature of the lens module 100 is limited to a range of: −0.04 mm~0.02 mm. In addition, as shown in FIG. 5, distortion of the lens module 100 is limited in a range of: −0.3%~1.5%.

Example 2

The lens module 100 in accordance with a second embodiment satisfies the tables 4-6, wherein F1=3.17 mm, F2=−7.29 mm, F3=2.27 mm, and F4=−2.33 mm, TTL=4.98 mm; Vd1−Vd2=47.76, F1/F=0.77, and F/TTL=0.83.

TABLE 4

| surface | Type | R (mm) | D (mm) | Nd | Vd | K |
|---|---|---|---|---|---|---|
| S1 | aspherical | 1.60438 | 0.512 | 1.553 | 71.7 | −0.798 |
| S2 | aspherical | 16.6459 | 0.024 | — | — | 150.947 |
| aperture stop | Flat | Infinity | 0.171 | — | — | — |
| S3 | aspherical | 6.33843 | 0.254 | 1.633 | 23.24 | 23.477 |
| S4 | aspherical | 2.62832 | 0.801 | — | — | 2.968 |
| S5 | aspherical | −1.9464 | 0.942 | 1.543 | 56.8 | −8.02 |
| S6 | aspherical | −0.8827 | 0.286 | — | — | −3.068 |
| S7 | aspherical | −7.121 | 0.446 | 1.531 | 55.7 | −197.741 |
| S8 | aspherical | 1.53225 | 1.092 | — | — | −11.010 |
| S9 | Flat | Infinity | 0.310 | 1.517 | 64.17 | — |
| S10 | Flat | Infinity | 0.140 | — | — | — |
| image plane 70 | Flat | Infinity | — | — | — | — |

TABLE 5

|    | A | B | C | D | E |
|----|---|---|---|---|---|
| S1 | 9.05720E-03 | 1.77254E-02 | -1.35398E-01 | 1.83509E-01 | -1.52003E-01 |
| S2 | -2.93450E-02 | -2.69649E-01 | 9.85391E-01 | -2.0688E+00 | 1.58640+00 |
| S3 | -3.56004E-02 | 3.71676E-02 | -2.44704E-02 | -2.3109E-01 | 3.92838E-01 |
| S4 | 1.95824E-02 | 1.25622E-01 | -2.93993E-01 | 4.44073E-01 | -1.84731E-01 |
| S5 | -9.25653E-02 | -5.32063E-02 | 2.03386E-01 | -2.6030E-01 | 1.26063E-01 |
| S6 | -1.51832E-01 | 7.66839E-02 | -3.33611E-02 | 1.15582E-02 | -1.12596E-03 |
| S7 | -7.20664E-03 | 3.29028E-03 | 3.03511E-04 | -1.7762E-04 | 1.14688E-05 |
| S8 | -3.28719E-02 | 5.81073E-03 | -1.09562E-03 | 1.62373E-04 | -1.10765E-05 |

TABLE 6

| F(mm) | F/No | 2ω |
|-------|------|-----|
| 4.13 | 2.79 | 64.74° |

Figure 6:
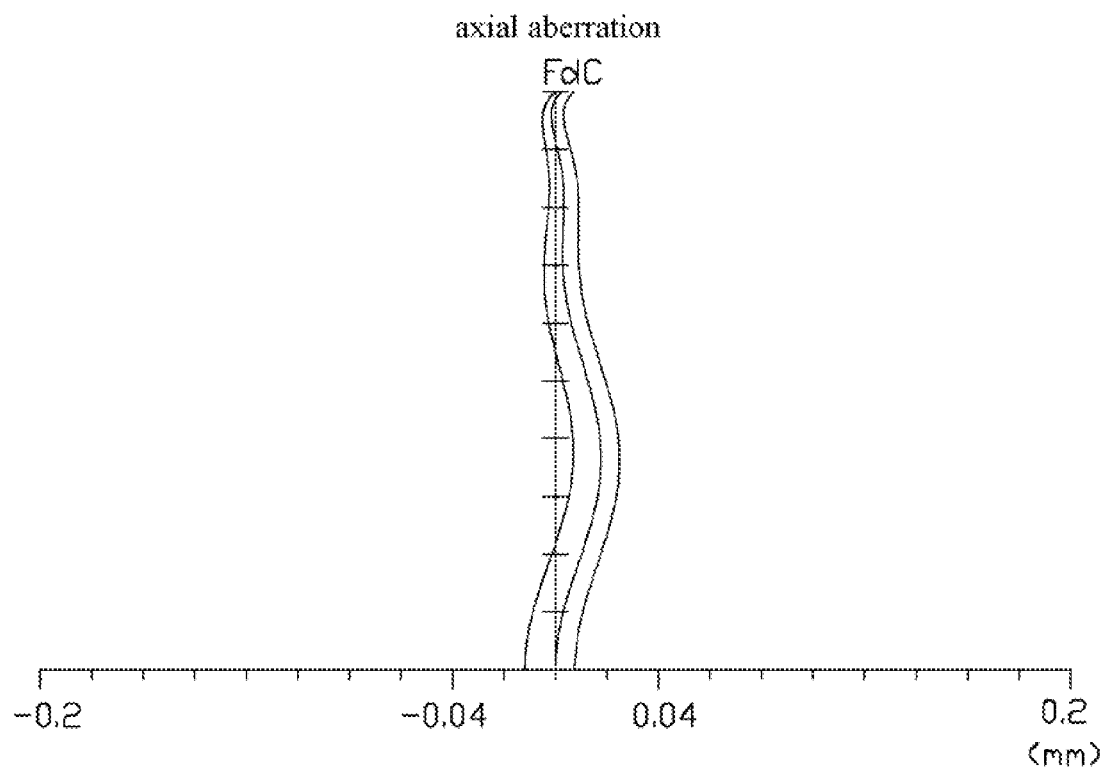
FIG. 6 is a graph showing characteristic curves of axial aberration of the lens module of FIG. 1 in accordance with a second embodiment.

As shown in FIG. 6, curves F, d, and C are respective axial aberration characteristic curves of F light (wavelength: 486.1 nm), d light (wavelength: 587.6 nm), and C light (wavelength: 656.3 nm) of the lens module 100 of the second embodiment.

Figure 7:
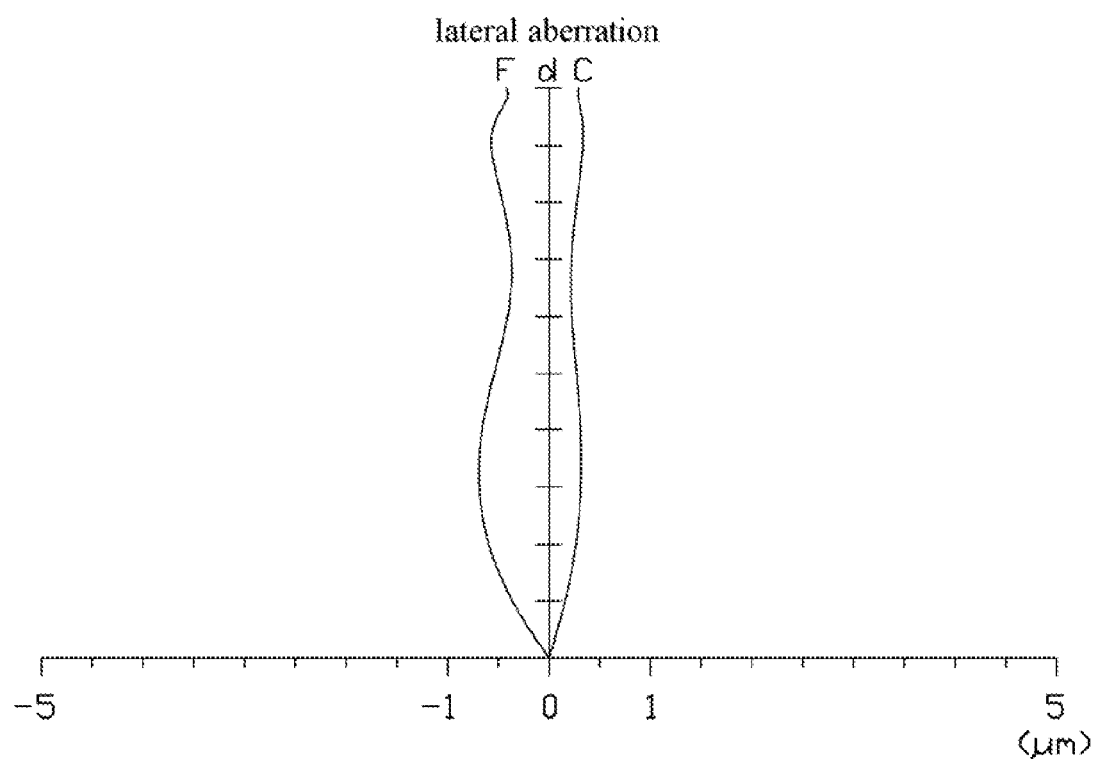
FIG. 7 is a graph showing characteristic curves of lateral aberration of the lens module of FIG. 1 in accordance with the second embodiment.
Figure 8:
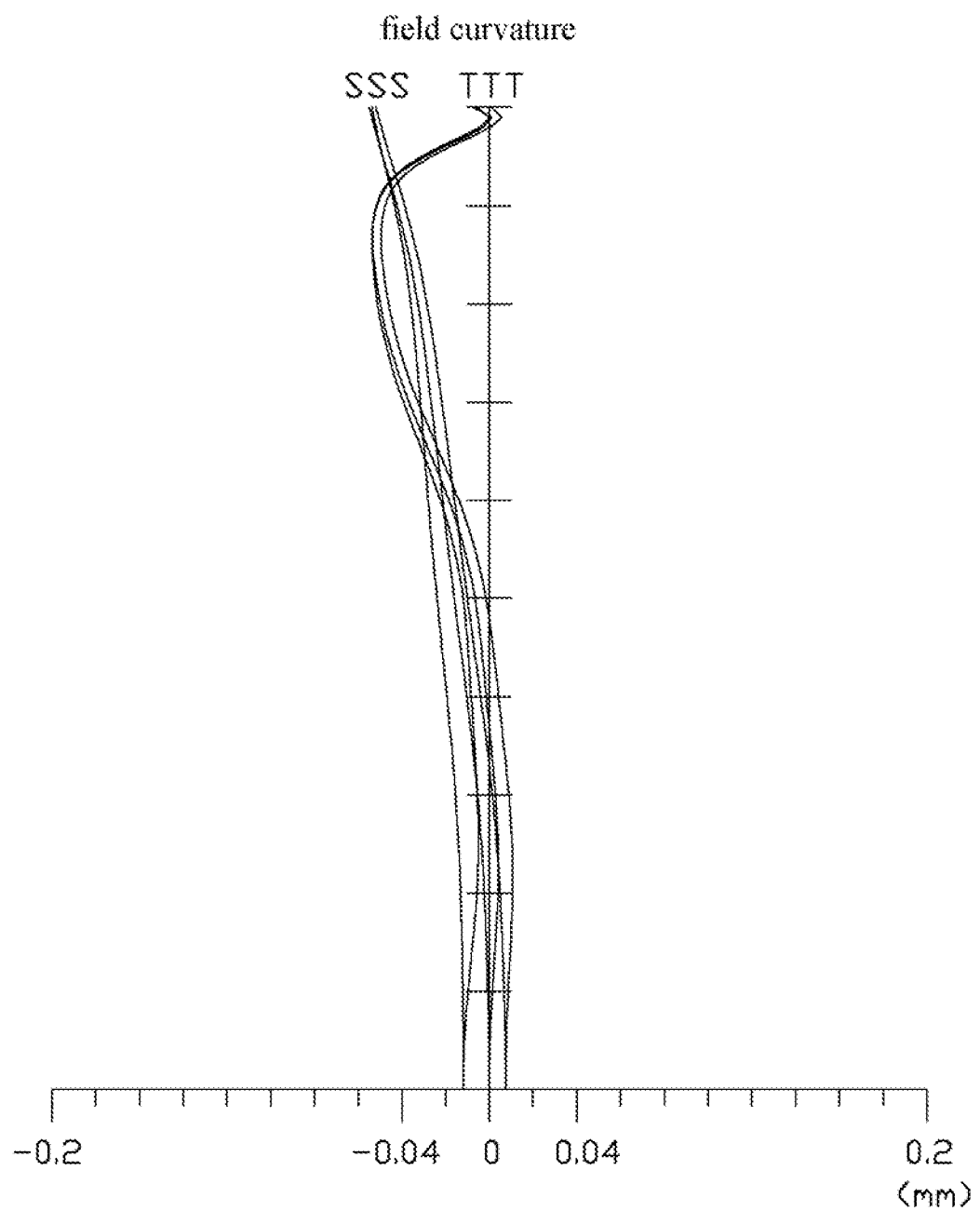
FIG. 8 is a graph showing characteristic curves of field curvature of the lens module of FIG. 1 in accordance with the second embodiment.
Figure 9:
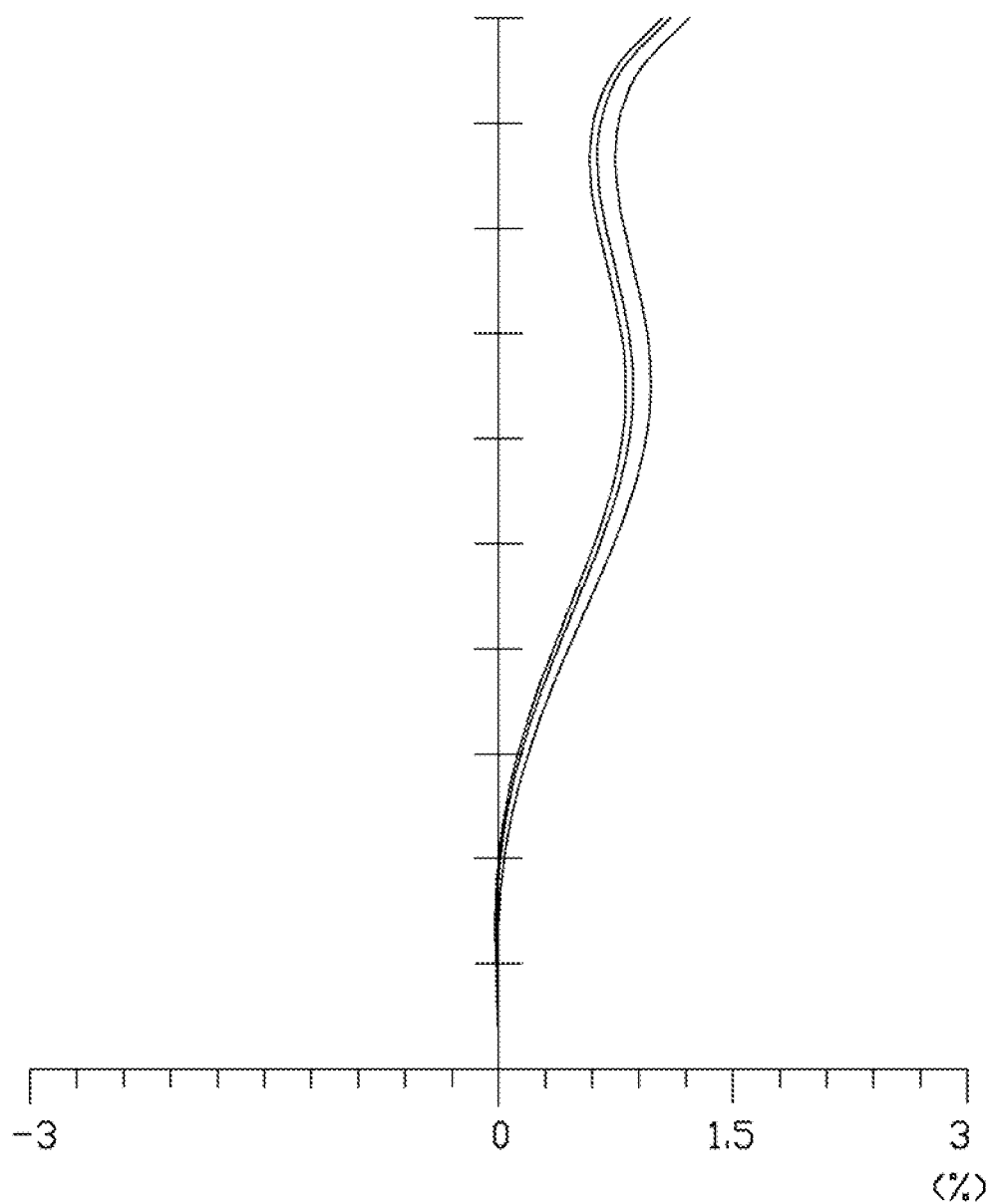
FIG. 9 is a graph showing characteristic curves of distortion of the lens module of FIG. 1 in accordance with the second embodiment.

In this embodiment, axial aberration of visible light (400-700 nm) of the lens module 100 is in a range of: −0.04 mm~0.04 mm. As shown in FIG. 7, curves F, d, and C are respective lateral aberration characteristic curves of F light, d light, and C light of the lens module 100 of the second embodiment. In this embodiment, lateral aberration of visible light (400-700 nm) of the lens module 100 is in a range of: −1 μm~0.5 μm. As shown in FIG. 8, the curves T and S are the tangential field curvature curve and the sagittal field curvature curve, respectively. In this embodiment, field curvature of the lens module 100 is limited to a range of: −0.04 mm~0.02 mm. In addition, as shown in FIG. 9, distortion of the lens module 100 of the second embodiment is limited in a range of: 0%~1.5%.

In the present disclosure, the first lens 10 is made of glass with low chromatic dispersion, the second lens 30 is made of plastic, and the first lens and the second lens satisfy the formula: Vd1−Vd2 35, this can simultaneously decrease chromatic abberation and reduce the cost of the lens module 100. Furthermore, the third lens and the fourth lens are made of plastic, which can further reduce the cost of the lens module 100.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module for imaging an object on an image plane, in the order from the object side to the image side thereof, comprising:

a first lens made of glass and having positive refraction power;
a second lens made of plastic and having negative refraction power;
a aperture stopper;
a third lens having positive refraction power; and
a fourth lens having negative refraction power;
wherein the lens module satisfies the following formula:

$$Vd1 - Vd2 \geq 35;$$

Wherein, Vd1 is an Abbe number of the first lens in d light, Vd2 is an Abbe number of the second lens in the d light, and the d light has a wavelength of 587.6 nm.

2. The lens module as claimed in claim 1, wherein the first lens comprises a convex first surface facing the object side and a concave second surface facing the image side; the second lens comprises a convex third surface facing the object side and a concave fourth surface facing the image side; the third lens comprises a concave fifth surface facing the object side and a convex sixth surface facing the image side; the fourth lens comprises a concave seventh surface facing the object side and a concave eighth surface facing the image side.

3. The lens module as claimed in claim 2, wherein each of the first surface, the second, the third surface, the fourth surface, the fifth surface, the sixth surface, the seventh surface, and the eighth surface is an aspherical surface.

4. The lens module as claimed in claim 2, wherein the lens module satisfies the following formula:

$$F/TTL \geq 0.5;$$

Wherein, F is the focal length of the lens module, and TTL is the distance between the first surface and the image plane along an optical axis of the lens module.

5. The lens module as claimed in claim 4, the lens module further satisfies the formula:

$$0.5 \leq F1/F \leq 1;$$

Wherein, F1 is the focal length of the first lens.

6. The lens module as claimed in claim 1, wherein the third lens and the fourth lens are made of plastic.

* * * * *